United States Patent Office 2,749,214
Patented June 5, 1956

2,749,214
PREPARATION OF CHROMIC COMPOUNDS

Arnold J. Eickhoff, Ridgewood, N. J., and Leonard M. Kebrich, Brooklyn, N. Y., assignors to National Lead Company, New York, N. Y., a corporation of New Jersey No Drawing. Application April 29, 1953,
Serial No. 352,038

8 Claims. (Cl. 23—51)

This invention relates to chromic compounds and more particularly to an improved method for the production of insoluble chromic compounds of acids of elements of group VB of the periodic system.

Chromic orthophosphate is well known to the art and has been prepared in numerous ways. Among the methods of preparation are included the reaction of ammonium phosphate and potassium dichromate in aqueous media in the presence of reducing agents and the reduction of alkali chromates or dichromates with sodium thiosulfate in the presence of phosphate ions. These and other prior art methods of preparation have generally been carried out in hot or boiling solution for conversion efficiency.

Chromic orthophosphate possesses valuable pigmentary and corrosion resistant properties. These properties, however, are very seriously impaired when the compound contains appreciable amounts of sulfates, chlorides and alkali metals such as sodium and potassium. Sulfates and chlorides in a pigment composition promote corrosion of the metal to be protected and the alkali metals sodium and potassium promote blistering of the pigment film. The prior art appreciated these disadvantages and attempted to suppress the formation of sparingly soluble impurities by employing an excess of some reactants to favor the formation of soluble impurities followed by a prolonged washing of the product to remove the soluble impurities. Such attempts have been unsatisfactory inasmuch as the products of prior art processes continued to contain appreciable quantities of the aforementioned impurities. The impurities associated with the production of chromic phosphate appear to be both physically and chemically combined with the product. This, plus the fact that chromic orthophosphate is an amorphous substance difficult to wash, makes it commercially impractical to completely remove the impurities. Other disadvantages of prior art processes have been the employment of excessive amounts of reactants, buffering agents and relatively high reaction temperatures, all of these factors tending to make the processes economically unattractive.

By the process of the instant invention, a product is obtained that is substantially free of deleterious impurities, having greatly improved properties as a corrosion inhibitive pigment and with important economies in the method of manufacture.

The principal object of this invention is to provide an improved method for the production of insoluble chromic compounds of the acids of elements of group VB of the periodic system. Another object is the production of chromic orthophosphate and chromic orthoarsenate having substantially improved pigment properties.

In its broadest aspects, this invention provides a method for making insoluble chromic compounds of the acids of group VB elements of the periodic system by treating an aqueous solution containing an alkali bichromate and an acid of an element of group VB with definite proportions of alkali sulfites and bisulfites within well defined limits of hydrogen ion concentration.

More particularly, chromic orthophosphate, chromic orthophosphite and chromic orthoarsenate are prepared by treating an aqueous solution containing an aklali bichromate and the appropriate acid, phosphoric, phosphorous, or arsenic, with definite proportions of alkali sulfites and bisulfites within the hydrogen ion concentration of about 1.0 to 4.5 pH measured at 25° C.

In the following detailed description, the invention will be described with reference to the preparation of chromic orthophosphate. It will be appreciated by those skilled in the art that the preparation of chromic orthoarsenate and chromic orthophosphite is similar in all respects except for the substitution of arsenic acid or phosphorous for phosphoric acid.

For chromic orthophosphate, a stirred aqueous solution containing an alkali bichromate and phosphoric acid at ordinary temperatures is treated with a solution containing a mixture of alkali sulfites and bisulfites, the pH value of the reaction mixture being maintained between about 1.0 and 4.5 throughout the process. The reaction, which proceeds with extreme ease even at room temperatures, results in the reduction of the bichromate to chromic sulfate, which in the presence of the phosphate ion precipitates as chromic orthophosphate in the form of very fine, dark green, amorphous particles. The formation of sparingly soluble sulfates is precluded by this technique and the product is recovered in a state of high purity. The product despite its non-crystalline character lends itself to washing by decantation; settles readily from solution and is of such a nature as to permit rapid handling by conventional filtration equipment.

The molar proportions and reactions involved may be summarized by the following equation:

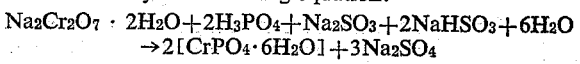

$Na_2Cr_2O_7 \cdot 2H_2O + 2H_3PO_4 + Na_2SO_3 + 2NaHSO_3 + 6H_2O$
$\rightarrow 2[CrPO_4 \cdot 6H_2O] + 3Na_2SO_4$ The washed and dried chromic orthophosphate contains about 40% combined water when dried at room temperatures. When the product is dried at 90 to 100° C. it contains about 24% combined water.

The formation of chromic orthophosphate may be satisfactorily conducted at elevated temperatures up to the boiling point of the mixture, but such practice offers no particular advantages. The concentration of the reactants in the aqueous solution is not critical and a wide range of solution concentrations may be employed.

The control of the hydrogen ion concentration or pH and the choice of reducing agents are the factors principally responsible for the production of a chromic orthophosphate pigment having enhanced corrosion resistant properties. The pH of the reaction mixture must be carefully maintained between about 1.0 and 4.5. A pH over about 4.5 induces the formation of sparingly soluble sulfate contaminants which are very difficult to remove from the amorphous product.

In practice, the reaction mixture containing alkali bichromate and phosphoric acid having a pH of about 1.0 is slowly neutralized and simultaneously reduced with a solution of alkali sulfites and bisulfites. The solution of sulfites and bisulfites will gradually raise the pH of the reaction mixture from 1.0 to about 4.5 pH. At about 2.75 a green precipitate of chromic orthophosphate appears and the precipitation continues through a pH of about 4.5 at which time all of the sulfite-bisulfite solution will have been added and the reaction completed.

The alkali sulfite solution is prepared on the basis of one mole of alkali sulfite to two moles of alkali bisulfite. This ratio of alkali sulfite and bisulfite in solution has a pH of about 6.2 and when added to the alkali bichromate-phosphoric acid solution will establish the proper conditions for the formation of chromic orthophosphate substantially free of harmful contaminants. It will be appreciated that sulfite reducing solutions of other proportions might be employed provided the conditions in the reaction mixture are not changed. For reasons of economy, one mole of sodium hydroxide may be combined with three moles of sodium bisulfite whereby a mole of sodium sulfite is generated. Sodium carbonate may be employed in place of sodium hydroxide for generating the sodium sulfite and in all cases the sodium salts may be replaced in the reaction by their equivalent ammonium and alkali metal salts.

The sulfite solution is added to the agitated chromate solution preferably over a period of about 2 to 4 hours. This relatively slow addition is helpful in preventing the formation of sparingly soluble sulfates and contributes to the fine particle size of the chromic orthophosphate pigment. Other variations for adding the reactants will be apparent to those skilled in the art. For example, some of the reactants may be added separately and may be added as solids or in solution. Such variations are within the scope of the present invention provided the proper reaction conditions are maintained as described above.

In order to more clearly illustrate this invention, the following examples are given:

EXAMPLE 1

*Preparation of chromic orthophosphate*

Solution A was prepared by dissolving 298.05 grams of sodium bichromate ($Na_2Cr_2O_7 \cdot 2H_2O$) in 4 liters of water and then adding 230.9 grams of phosphoric acid (84.92% $H_3PO_4$). This solution had a pH value of 1.1.

Solution B consisted of 289.6 grams of commercial grade sodium metabisulfite, assaying 107.8% as $NaHSO_3$, and 41.2 grams of sodium hydroxide, assaying 97.1% NaOH, dissolved in water and the whole diluted to 750 ml. This solution had a pH value of 6.20.

Solution A was placed into a suitable container equipped with a mechanical agitator and solution B was slowly added as indicated in the following log. At the start of the sulfite addition the temperature of solution A was 20° C. and the temperature of solution B 30° C. This reaction mixture was constantly agitated during the addition of solution B. As the reaction progressed the following observations were noted:

| Time | ml. B added | Reaction Mixture | | |
|---|---|---|---|---|
| | | Temp., °C. | pH | Color |
| Start | 0 | 20 | 1.80 | reddish. |
| 15 min | 100 | 24 | | red-brown. |
| 29 min | 200 | 26 | | Do. |
| 37 min | 300 | 30 | | Do. |
| 53 min | 415 | 33 | 2.75 | green-brown. |
| 72 min | 445 | 33 | | Do. |
| 88 min | 560 | 33 | | green. |
| 106 min | 595 | 35 | 3.2 | Do. |
| 123 min | 695 | 35 | | Do. |
| 178 min | 750 | 34 | | Do. |
| 210 min | | | 4.0 | Do. |

The green product was filtered, washed with water and dried at 70° C. The dried amorphous material had an extremely soft texture and analyzed as follows:

| | Per cent |
|---|---|
| Sulfate, $SO_4$ | 0.22 |
| Chloride, Cl | <0.005 |
| Sodium oxide, $Na_2O$ | 0.10 |
| Potassium oxide, $K_2O$ | <0.01 |
| Balance substantially all chromic orthophosphate. | |

The pigment properties were as follows:

| | |
|---|---|
| Specific gravity 25°/25° C. | 2.42. |
| Refractive index | 1.61. |
| Physical form | Amorphous. |
| Av. particle size by surface mean | 7 microns. |
| Oil absorption | 33. gm. oil/100 gm. pigment. |
| Apparent density | 6.1 gm./cu. in. |

The following example illustrates the practice of this invention in the preparation of chromic orthoarsenate.

EXAMPLE 2

*Preparation of chromic orthoarsenate*

Solution C was prepared by dissolving 107.3 grams of sodium bichromate, $Na_2Cr_2O_7 \cdot 2H_2O$, and 544 grams of 18.8% arsenic acid, $H_3AsO_4$, in water and diluting to 2 liters. This solution had a pH of 1.5.

Solution D was prepared by dissolving 14.4 grams of sodium hydroxide and 112.4 grams of sodium bisulfite in water and then diluting to 0.5 liter. This solution had a pH of 6.2.

Solution D was slowly added to the constantly agitated solution C as in Example 1. The maximum temperature attained by the reaction mixture was 28° C. and the final pH 4.3.

The light green precipitate was separated, washed and dried as above. The amorphous product analyzed as follows:

| | Per cent |
|---|---|
| Sulfate, $SO_4$ | 0.40 |
| Chloride, Cl | <0.005 |
| Sodium oxide, $Na_2O$ | 0.08 |
| Potassium oxide, $K_2O$ | 0.01 |
| Balance substantially all chromic orthoarsenate. | |

Chromic orthoarsenate prepared as above is a green powder having the following pigment properties:

| | |
|---|---|
| Specific gravity 25°/25° C. | 2.80. |
| Refractive index | 1.67. |
| Physical form | Amorphous. |
| Av. particle size by surface mean | 10 microns. |
| Oil absorption | 48 gm oil/100 gm. pigment. |
| Apparent density | 6.6 gm/cu. in. |

EXAMPLE 3

*Preparation of chromic orthophosphite*

Chromic orthophosphite, $Cr_2(HPO_3)_3$ was prepared according to the process described in Example 1 by substituting 338 grams of 72.7% phosphorous acid solution for the phosphoric acid.

Chromic orthophosphate made according to the method of this invention has unusual value when employed in coating compositions known as wash primers or metal conditioners. Wash primers are generally applied directly to the metal surfaces to be protected to form a thin film about 0.3 mil in thickness followed by a protective paint coating over the wash primer. Basic zinc chromate polyvinyl butyral resin composition conforming to U. S. Government Military Specification MIL-P-15328 is a standard wash primer and it was employed for comparison tests against the chromic orthophosphate of the instant invention.

In order to more clearly illustrate the advantages of the chromic orthophosphate of the instant invention, two commercial samples of chromic orthophosphate of different origin were tested for performance in the same comparison tests. These commercial samples analyzed as follows:

|  | Sample A | Sample B |
|---|---|---|
|  | Percent | Percent |
| Sulfate, $SO_4$ | 1.6 | 3.0 |
| Chloride, Cl | <0.001 | <0.005 |
| Sodium Oxide, $Na_2O$ | 3.4 | 6.4 |
| Potassium Oxide, $K_2O$ | 0.90 | 0.05 |
| Chromic Orthophosphate | Balance | Balance |

The test panels were prepared by applying the wash primers to clean water-break-free 3 x 5 inch cold rolled auto-body steel panels to form a film 0.3 to 0.4 mil in thickness. This was followed by 2 coats of anticorrosive paint totalling about 2 mils in thickness. The panels tested in the fresh water blistering test had a red lead-vinyl anticorrosive paint coating and those tested in the salt spray test had a red lead-alkyd anticorrosive paint coating. The panels were air dried for 6 days before the tests.

FRESH WATER BLISTERING TEST

The tap water immersion test consisted of continuous immersion of the panels in tap water maintained at 110° to 113° F. The water was changed three times weekly. The principal form of film failure was blistering. 10 indicates no blistering, 1 indicates complete blistering. A reading of about 4 or less indicates substantial failure of the protective coating.

|  | Days on Test | | | | | | | | | |
|---|---|---|---|---|---|---|---|---|---|---|
|  | 3 | 7 | 16 | 24 | 31 | 45 | 65 | 73 | 111 | 133 |
| Chromic orthophosphate of the instant invention | 10 | 10 | 10 | 10 | 10 | 10 | 8 | 7 | 7 | 5 |
| Basic zinc chromate polyvinyl butyral | 10 | 3 |  |  |  |  |  |  |  |  |
| Commercial Sample A chromic orthophosphate | 10 | 10 | 10 | 4 | 3 | 1 |  |  |  |  |
| Commercial Sample B chromic orthophosphate | 10 | 10 | 10 | 7 | 4 | 3 | 1 |  |  |  |

SALT SPRAY TEST

The salt spray test consisted of exposing the panels in a salt fog box for 28 days and then determining the percentage of peeling from planimeter measurements. The salt concentration was 5% and the box temperature maintained at 93° to 97° F.

Area peeled, percent
Chromic orthophosphate of the instant invention____ 28
Basic zinc chromate polyvinyl butyral_____ 64
Commercial Sample A, chromic orthophosphate_____ 43
Commercial Sample B, chromic orthophosphate_____ 44

The foregoing examples and tests illustrate the improved pigments produced according to the method of this invention. They exhibit greatly enhanced corrosion resistance when applied to metal surfaces in conjunction with conventional protective paints. In addition this process results in an increased over-all economy because of the conversion efficiency, low reaction temperatures, and the fineness and purity of the product.

While the invention has been described and illustrated by the examples shown, it is not intended to be limited thereto, and other embodiments and variations may be employed within the scope of the following claims.

We claim:

1. A process for the manufacture of insoluble chromic compounds which comprises adding an aqueous solution of alkali sulfites and alkali bisulfites to a mixture containing an alkali bichromate and an acid selected from the group consisting of phosphoric, phosphorous and arsenic acids, while maintaining the hydrogen ion concentration of the reaction mixture between a pH of about 1.0 and 4.5.

2. A process for the manufacture of insoluble chromic compounds which comprises adding an aqueous solution of alkali sulfites and alkali bisulfites to a mixture containing an alkali bichromate and an acid selected from the group consisting of phosphoric, phosphorous and arsenic acids, said solution of alkali sulfites and alkali bisulfites prepared in the proportion of one mole of alkali sulfite to two moles of alkali bisulfite, while maintaining the hydrogen ion concentration of the reaction mixture between a pH of about 1.0 and 4.5.

3. A process for the manufacture of chromic orthophosphate which comprises adding an aqueous solution of alkali sulfites and alkali bisulfites to a mixture containing an alkali bichromate and phosphoric acid, while maintaining the hydrogen ion concentration of the reaction mixture between a pH of about 1.0 and 4.5.

4. A process for the manufacture of chromic orthoarsenate which comprises adding an aqueous solution of alkali sulfites and alkali bisulfites to a mixture containing an alkali bichromate and arsenic acid while maintaining the hydrogen ion concentration of the reaction mixture between a pH of about 1.0 and 4.5.

5. A process for the manufacture of chromic orthophosphate which comprises adding an aqueous solution of alkali sulfites and alkali bisulfites to a mixture containing an alkali bichromate and phosphoric acid, said solution of alkali sulfites and alkali bisulfites prepared in the proportion of one mole of alkali sulfite to two moles of alkali bisulfite, while maintaining the hydrogen ion concentration of the reaction mixture between a pH of about 1.0 and 4.5.

6. A process according to claim 5 in which the reaction mixture is prepared on the basis of one mole of alkali bichromate to two moles of phosphoric acid.

7. A process for the manufacture of chromic orthoarsenate which comprises adding an aqueous solution of alkali sulfites and alkali bisulfites to a mixture containing an alkali bichromate and arsenic acid, said solution of alkali sulfites and alkali bisulfites prepared in the proportion of one mole of alkali sulfite to two moles of alkali bisulfite, while maintaining the hydrogen ion concentration of the reaction mixture between a pH of about 1.0 and 4.5.

8. A process according to claim 7 in which the reaction mixture is prepared on the basis of one mole of alkali bichromate to two moles of arsenic acid.

References Cited in the file of this patent

Mellor: Comprehensive Treatise on Inorganic and Theoretical Chemistry, pages 479, 336, volume 11. Longmans, Green and Co., New York, 1931.

Ness et al.: "Preparation and Properties of Chromic Phosphate," Journal of American Chemical Society, vol. 74, #18, pages 4685–4691.